United States Patent
Mizoguchi et al.

(10) Patent No.: US 10,087,795 B2
(45) Date of Patent: Oct. 2, 2018

(54) SEALING-EQUIPPED OIL PAN

(71) Applicant: AISIN AW CO., LTD., Anjo-shi, Aichi-ken (JP)

(72) Inventors: Yasuhiro Mizoguchi, Nagoya (JP); Toshiaki Saiki, Anjo (JP); Mikio Iwase, Anjo (JP)

(73) Assignee: AISIN AW CO., LTD., Anjo-shi, Aichi-ken (JP)

( * ) Notice: Subject to any disclaimer, the term of this patent is extended or adjusted under 35 U.S.C. 154(b) by 189 days.

(21) Appl. No.: 15/021,431

(22) PCT Filed: Sep. 26, 2014

(86) PCT No.: PCT/JP2014/075608
§ 371 (c)(1),
(2) Date: Mar. 11, 2016

(87) PCT Pub. No.: WO2015/046418
PCT Pub. Date: Apr. 2, 2015

(65) Prior Publication Data
US 2016/0222846 A1    Aug. 4, 2016

(30) Foreign Application Priority Data
Sep. 30, 2013 (JP) ................ 2013-205070

(51) Int. Cl.
*F01M 11/00* (2006.01)
*F02F 11/00* (2006.01)
*F16J 15/06* (2006.01)

(52) U.S. Cl.
CPC ......... *F01M 11/0004* (2013.01); *F02F 11/00* (2013.01); *F16J 15/061* (2013.01);
(Continued)

(58) Field of Classification Search
CPC combination set(s) only.
See application file for complete search history.

(56) References Cited

U.S. PATENT DOCUMENTS 2,475,836 A * 7/1949 Henricksen ............. F02B 77/00
184/106
4,394,853 A * 7/1983 Lopez-Crevillen .......... F01M 11/0004
123/195 C
(Continued)

FOREIGN PATENT DOCUMENTS

| JP | 60-15954 U | 2/1985 |
| JP | 60-24858 U | 2/1985 |

(Continued)

OTHER PUBLICATIONS

International Search Report for PCT/JP2014/075608 dated Dec. 9, 2014.

*Primary Examiner* — Michael A Riegelman
(74) *Attorney, Agent, or Firm* — Sughrue Mion, PLLC

(57) ABSTRACT

A sealing-equipped oil pan includes a gasket and an oil pan having a bottom portion and a peripheral wall for storing oil, and a ring-shaped rim portion located at an end of the peripheral wall and provided with the gasket, and is fastened to a target device with the gasket interposed between the rim portion and the target device. The gasket has a projection projecting from a sealing surface configured to come into contact with the target device for sealing. The peripheral wall of the oil pan has a base portion projecting from the rim portion and supporting the projection of the gasket. The base portion supports the projection of the gasket to prevent the gasket from tilting with respect to the rim portion, thereby preventing protrusion of the gasket.

10 Claims, 7 Drawing Sheets

(52) U.S. Cl.
CPC .... *F16J 15/062* (2013.01); *F01M 2011/0054* (2013.01); *F01M 2011/0058* (2013.01); *F01M 2011/0062* (2013.01)

(56) References Cited

U.S. PATENT DOCUMENTS

| | | | | |
|---|---|---|---|---|
| 4,667,628 A | * | 5/1987 | Lopez-Crevillen | F01M 11/0004 123/195 C |
| 5,536,023 A | * | 7/1996 | Surbrook | F16J 15/061 277/593 |
| 5,983,852 A | * | 11/1999 | Weitz | F16J 15/024 123/195 C |
| 6,561,522 B1 | * | 5/2003 | Radelet | F16J 15/021 277/314 |
| 6,707,678 B2 | * | 3/2004 | Kobayashi | H05K 5/0052 361/752 |
| 2003/0024768 A1 | * | 2/2003 | Jones | F01M 11/0004 184/1.5 |

FOREIGN PATENT DOCUMENTS

| | | |
|---|---|---|
| JP | 61-178054 U | 11/1986 |
| JP | 2002-372152 A | 12/2002 |
| JP | 2005-155456 A | 6/2005 |
| JP | 2005-188533 A | 7/2005 |
| JP | 2006-316962 A | 11/2006 |

* cited by examiner

SEALING-EQUIPPED OIL PAN

CROSS REFERENCE TO RELATED APPLICATIONS

This application is a National Stage of International Application No. PCT/JP2014/075608 filed Sep. 26, 2014, claiming priority based on Japanese Patent Application No. 2013-205070 filed Sep. 30, 2013, the contents of all of which are incorporated herein by reference in their entirety.

TECHNICAL FIELD

The present art relates to an oil pan equipped with sealing that is fastened to a device such as an automatic transmission, a hybrid drive device, or an engine and encloses and stores oil to be circulated.

BACKGROUND ART

In general, a device such as an automatic transmission, a hybrid drive device, or an engine that is mounted in a vehicle is subjected to lubrication and cooling using oil and, depending on the configuration of a device, to hydraulic control using oil. To collect and store oil used for such purposes, an oil pan is provided below the device, for example. The oil pan is attached to the device in such a manner that a gasket made of rubber or the like for sealing oil is interposed between the oil pan and the device, and the oil pan is fastened to the device with a plurality of bolts (see Patent Document 1).

RELATED-ART DOCUMENTS

Patent Documents

[Patent Document 1] Japanese Patent Application Publication No. 2005-188533 (JP 2005-188533 A)

SUMMARY

In the case of attaching an oil pan to a target device with a gasket interposed therebetween as described above, as a general assembly, a gasket is placed on a ring-shaped rim portion of the oil pan and then the oil pan provided with the gasket is fastened to the target device with bolts.

The gasket described above preferably has a low rigidity in order to secure sealing performance. However, in such a general assembly, when the oil pan is attached to the target device with the gasket placed on the oil pan, if the rim portion of the oil pan has a long straight portion, the gasket tends to tilt with respect to the rim portion during attachment operation, and protrude from the rim portion when the oil pan is attached to the target device, resulting in the possibility of degradation of sealing performance.

In view of this, it is an object of the present disclosure to provide a sealing-equipped oil pan that can prevent a sealing member from tilting with respect to a rim portion of an oil pan and secure sealing performance when attaching the oil pan to a target device.

A sealing-equipped oil pan of the present disclosure is a sealing-equipped oil pan comprising: a sealing member that is composed of an elastic member; and an oil pan that has a bottom portion, a peripheral wall, and a rim portion, the bottom portion and the peripheral wall being configured to store oil, the rim portion having a ring shape, located at an end of the peripheral wall, and provided with the sealing member, the sealing-equipped oil pan being configured to be fastened to a target device with the sealing member being interposed between the rim portion and the target device, and wherein the sealing member has a projection projecting from a sealing surface configured to come into contact with the target device for sealing, and the peripheral wall of the oil pan has a base portion projecting from the rim portion and supporting the projection of the sealing member.

With this configuration, since the projection of the sealing member is supported by the base portion of the oil pan, a tilt of the sealing member with respect to the rim portion of the oil pan can be prevented, and the sealing member does not protrude when the oil pan is attached to the target device, thereby securing sealing performance.

In the above description, the parenthesized reference numerals are used for reference to the drawings merely for facilitating understanding of the present subject matter, and is not intended to have any influence on the scope of the claims.

DETAILED DESCRIPTION OF THE PREFERRED EMBODIMENT

An embodiment will be described with reference to FIGS. 1 to 6. In the following description, a sealing-equipped oil pan 1 according to the embodiment is attached to an automatic transmission (a target device) mounted in a vehicle, for example. However, the sealing-equipped oil pan 1 is not necessarily attached to the automatic transmission and can be attached to any device in which oil is circulated, such as a hybrid driving device or an engine.

Figure 1:
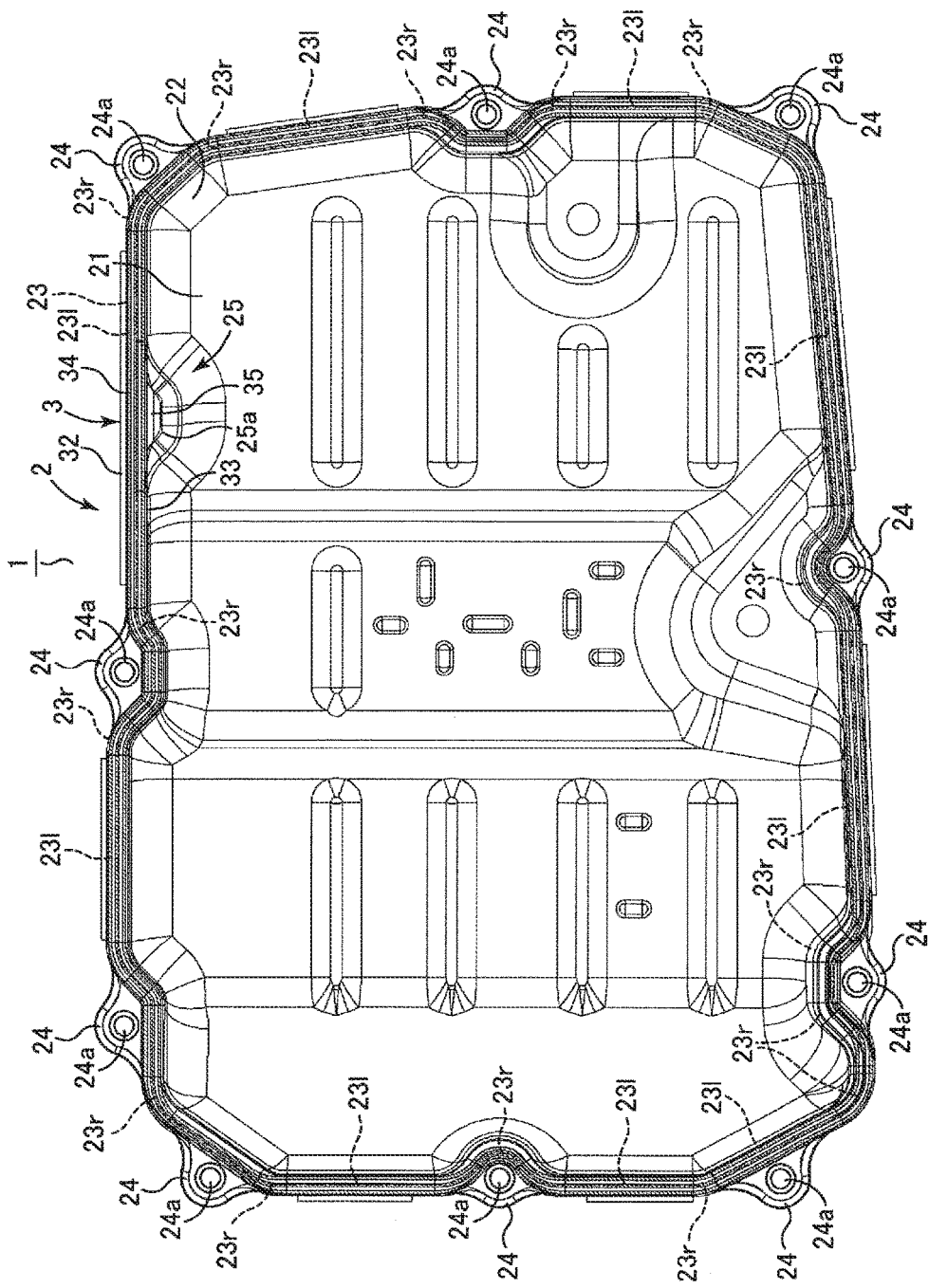
FIG. 1 is a top view illustrating a sealing-equipped oil pan according to an embodiment.

As illustrated in FIG. 1, the sealing-equipped oil pan 1 of this embodiment includes an oil pan 2 and a gasket (sealing member) 3 provided to the oil pan. The oil pan 2 is fastened to a transmission case 40 (see FIG. 4) of an automatic transmission 4 using bolts (not shown) with the gasket 3 interposed between the oil pan 2 and the transmission case 40.

Figure 3:
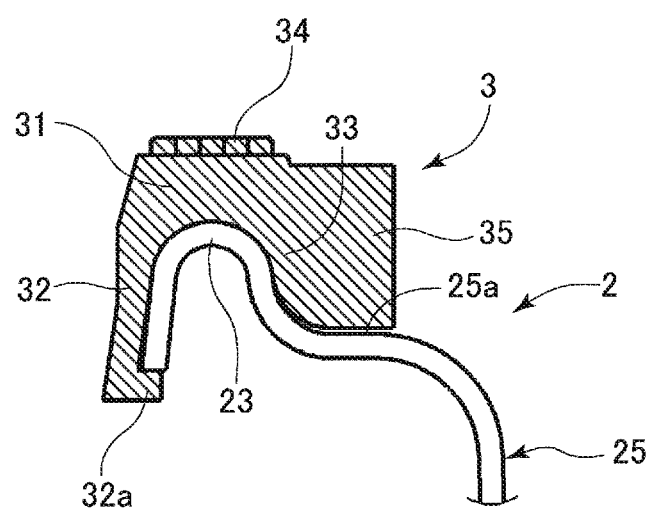
FIG. 3 illustrates a cross-sectional view taken along arrows A-A in FIG. 2.

The oil pan 2 includes a bottom portion 21, a peripheral wall 22 standing upward from the periphery of the bottom portion 21, and a rim portion 23 having a ring shape when viewed from above, disposed at an upper end of the peripheral wall 22, and bending into a U shape in a cross-sectional view (see FIG. 3). The oil pan 2 is configured to store oil in a region surrounded by the bottom portion 21 and the peripheral wall 22. Outside the rim portion 23, a plurality of (ten in the embodiment) washer portions 24 having bolt holes 24a through which bolts (not shown) are screwed to the transmission case 40 of the automatic transmission 4 are formed to extend outward from the rim portion 23. The bottom portion 21, the peripheral wall 22, the rim portion 23, and the washer portions 24 are integrally constituted, and are formed by, for example, press work. The bottom portion 21 is provided with a plurality of rib shapes for increasing the strength of the oil pan 2.

When viewed from above, the rim portion 23 does not overlap the washer portions 24, and includes bent portions 23r that are bent so as to extend inside the washer portions 24 at the four corners of the oil pan 2, and also includes relatively short straight portions 231 connecting the bent portions 23r. In the straight portions forming four sides connecting the four corners of the oil pan 2, the rim portion 23 is constituted by bent portions 23r that are bent while avoiding the washer portions 24 and relatively long straight portions 231 connecting the bent portions 23r. That is, especially on the four sides of the oil pan 2, the rim portion 23 includes portions serving as the straight portions 231 each disposed between two of the washer portions 24 and having a predetermined length or more. The rim portion 23 thus configured is provided with the gasket 3 formed into the same shape as that of the rim portion 23 when viewed from above.

Figure 7:
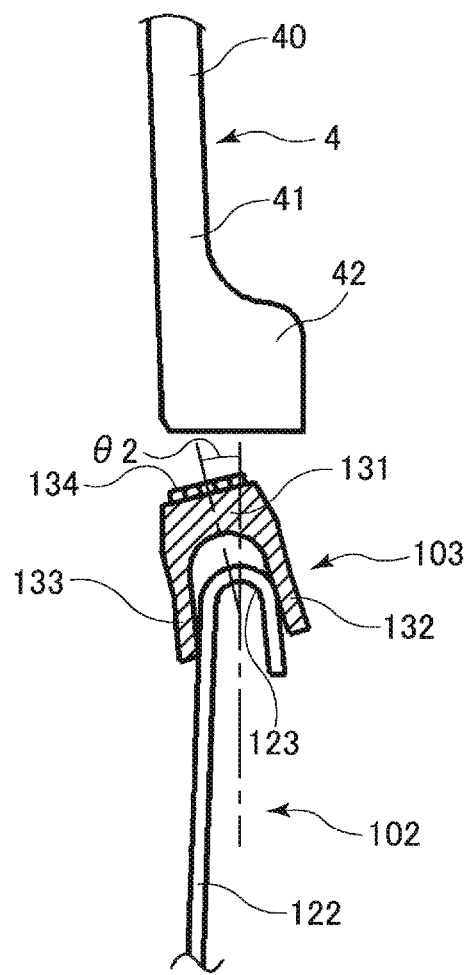
FIG. 7 is an enlarged cross-sectional view illustrating a tilt angle of a gasket according to the related art.

Here, an oil pan 102 and a gasket 103 according to the related art will be described with reference to FIG. 7. As illustrated in FIG. 7, the oil pan 102 is provided with a U-shaped rim portion 123 at an upper end of a peripheral wall 122. The gasket 103 has a U-shaped groove in a bottom portion thereof formed by two side wall portions 132 and 133 extending downward from a gasket body 131 along a shape of the rim portion 123. In addition, the gasket 103 is provided with a sealing surface 134 in an upper portion thereof. On the other hand, an automatic transmission 4 includes, in a lower portion thereof, a flange 41 extending downward in a flange shape and a thick matching portion 42 formed at a front end of the flange 41 and configured to be in close contact with the sealing surface 134 of the gasket 103.

The gasket 103 is generally composed of an elastic member such as rubber, and is provided by being attached to the oil pan 102 with a jig before the oil pan 102 is fastened to the automatic transmission 4. At this time, when the rim portion 123 of the oil pan 102 is provided to the bent portion when viewed from above, the rim portion 123 comes into close contact with the bent portion so that the gasket 103 is less likely to tilt inward or outward of the oil pan 102 (i.e., a method intersecting a fastening direction of the oil pan). However, in a case where a cross-sectional portion illustrated in FIG. 7 is an intermediate portion in a straight portion having a predetermined length or more as described above, for example, the gasket 103 is likely to tilt inward or outward from the oil pan 102. For example, if the gasket 103 tilts inward at an angle of θ2 as illustrated in FIG. 7, when attaching and fastening the oil pan 102 to the transmission case 40 of the automatic transmission 4 with bolts (not shown), the gasket 103 is pushed further inward so that the gasket 103 may protrude from a joint location between the transmission case 40 and the oil pan 102 at the end of assembly.

Figure 2:
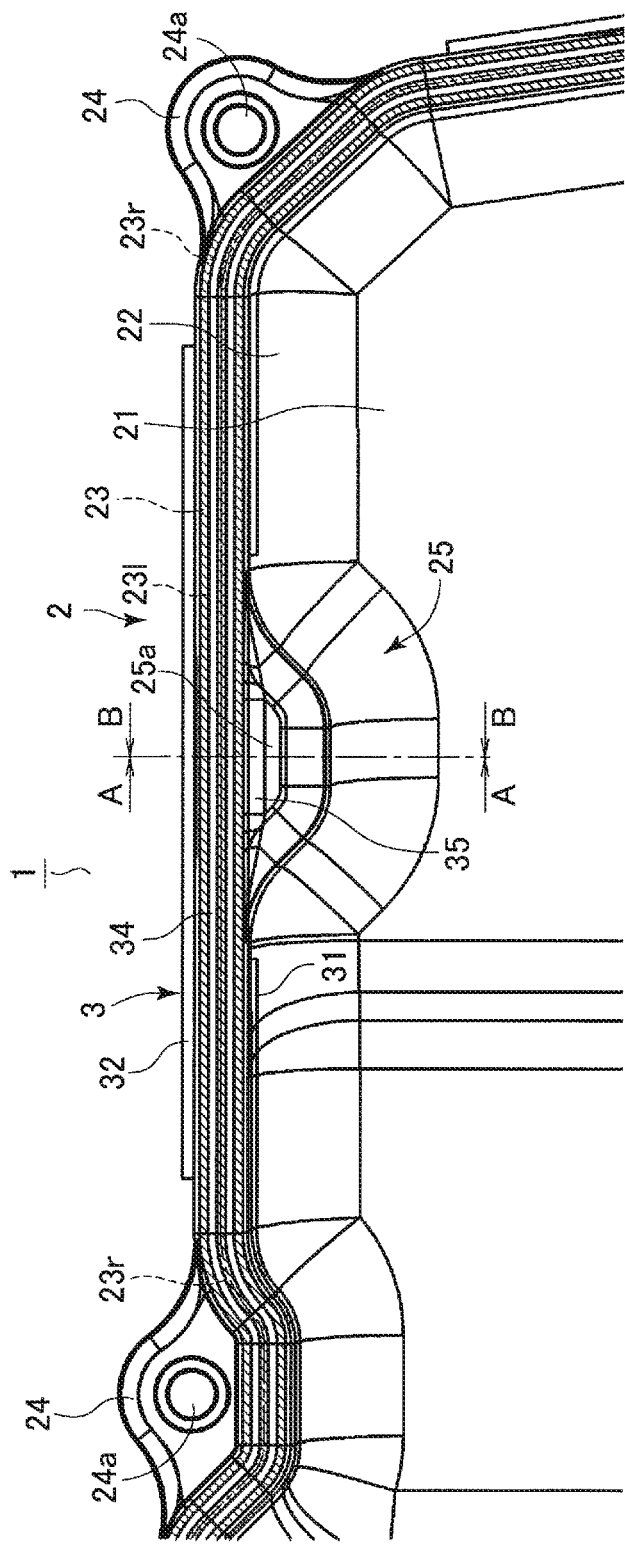
FIG. 2 is an enlarged top view illustrating a base portion of an oil pan and a projection of a gasket.

To prevent this problem, in this embodiment, as illustrated in FIG. 2, a base portion 25 expanding inward from the rim portion (that is, in a direction intersecting the fastening direction of the oil pan, and toward a region where oil is stored) is provided between one of the washer portions 24 at the four corners of the oil pan 2 and another one of the washer portions 24 at an intermediate portion of the four corners and substantially at the middle of the peripheral wall 22 corresponding to one of the straight portions 231 of the rim portion 23 having a predetermined length or more. The base portion 25 as a whole expands into substantially a trapezoidal shape whose longer bottom side faces the rim portion 23 when viewed from above, and has a trapezoidal flat portion 25a located in an upper part of the base portion 25 and having a longer bottom portion facing the rim portion 23 also when viewed from above. The base portion 25 is in a shape that can be formed simultaneously when the oil pan 2 is formed by, for example, press work, using a mold used for the formation of the oil pan 2 by, for example, press work. The oil pan 2 need not be formed by press work, and may be formed by casting. Even in such a case, the base portion 25 needs to have a shape that can be formed by casting.

On the other hand, as illustrated in FIG. 3, the gasket 3 has a U-shaped groove in a bottom portion thereof formed by two side wall portions 32 and 33 extending downward from a gasket body 31 along a shape of the rim portion 23. The side wall portion 32 has a return portion 32a projecting inward at a distal end thereof so that the return portion 32a is easily engaged with the distal end of the rim portion 23 of the oil pan 2. As illustrated in FIGS. 1 to 3, the gasket 3 has the sealing surface 34 at the upper portion thereof. The side wall portion 33 of the gasket 3 has a projection 35 projecting inward (in a direction intersecting the fastening direction of the oil pan) from the sealing surface 34 toward the base portion 25 at a location corresponding to the base portion 25. The projection 35 has a shape corresponding to the flat portion 25a of the base portion 25 when viewed from above, that is, has a trapezoidal shape slightly smaller than that of the flat portion 25a when viewed from above. Thus, the gasket 3 has a large thickness larger in the projection 35 than in the side wall portion 32 located outside the rim portion 23. That is, a height of the projection 35 inside the rim portion 23 is larger than a height of the projection 35 outside the rim portion 23. The gasket 3 thus configured is fitted in the rim portion 23 of the oil pan 2 in such a manner that the U-shaped groove in the gasket 3 matches the shape of the rim portion 23, and is disposed above the rim portion 23. At this time, the projection 35 is supported by the flat portion 25a of the base portion 25 from below.

Figure 4:
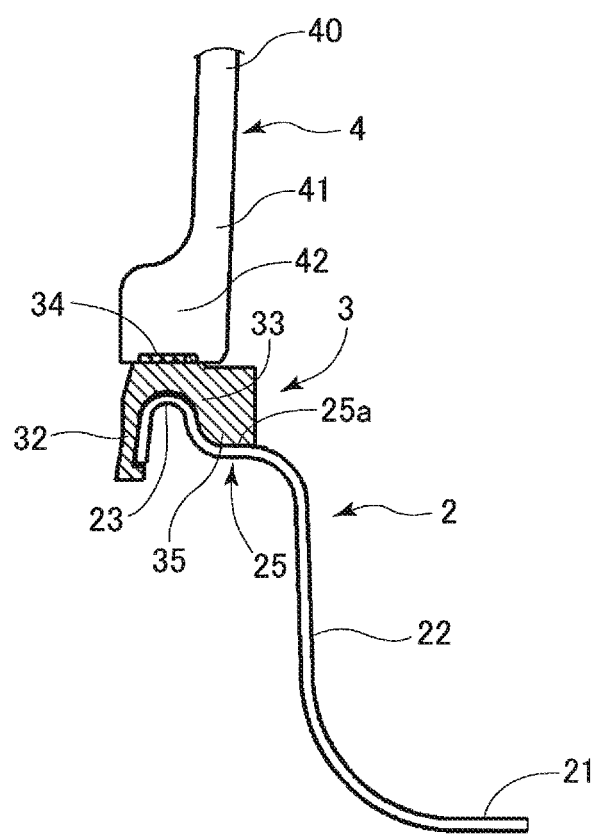
FIG. 4 is an enlarged cross-sectional view illustrating a state in which an oil pan is attached to an automatic transmission.
Figure 5:
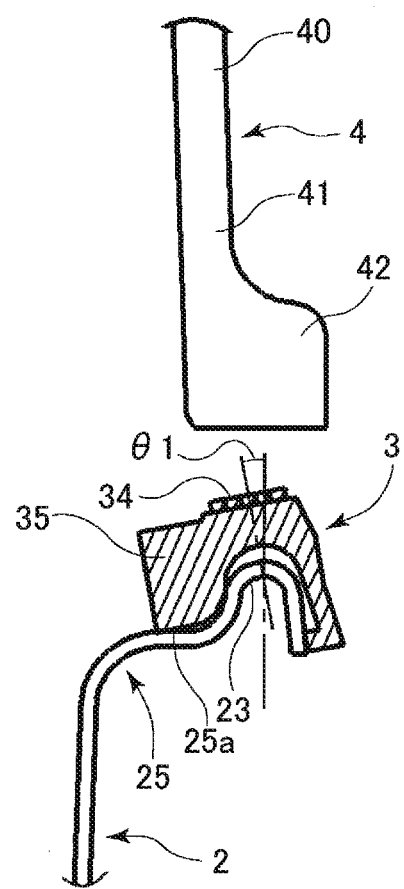
FIG. 5 is an enlarged cross-sectional view illustrating a tilt angle of a gasket at the time of assembly.
Figure 6:
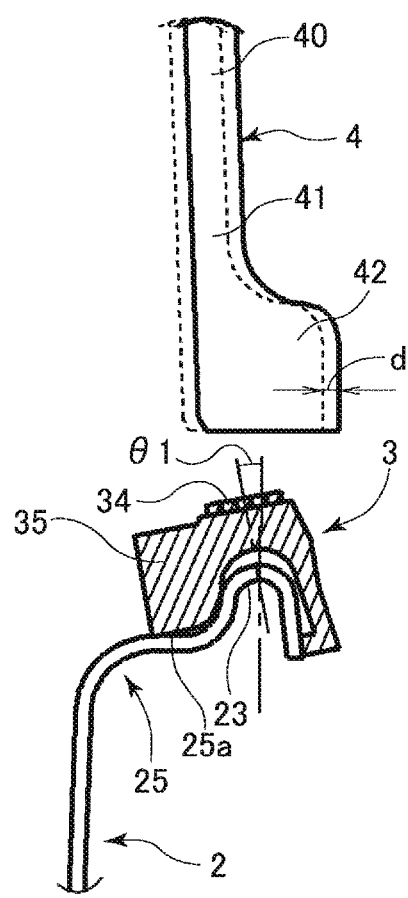
FIG. 6 is an enlarged cross-sectional view illustrating a displacement between an automatic transmission and the oil pan at the time of assembly.

An anti-tilt structure of the gasket 3 will be described based on an assembly process in fastening the sealing-equipped oil pan 1 according to the embodiment to the automatic transmission 4 with reference to FIGS. 4 to 6. FIG. 4 is a cross-sectional view taken along arrows A-A in FIG. 2. FIGS. 5 and 6 are cross-sectional views taken along arrows B-B in FIG. 2.

When assembling the sealing-equipped oil pan 1 to the transmission case 40 of the automatic transmission 4, the gasket 3 is first set on a jig (not shown), and is placed on the rim portion 23 of the oil pan 2 using the jig. Then, as illustrated in FIG. 5, the gasket 3 is provided to the rim portion 23 of the oil pan 2. At this time, in the straight portions 231 (see FIGS. 1 and 2) of the rim portion 23 each having a predetermined length or more, a force is generated to tilt the gasket 3 inward. However, the projection 35 of the gasket 3 is supported by the flat portion 25a of the base portion 25 so that a tilt of the gasket 3 is reduced to an angle θ1 that is smaller than an angle θ2 in a related art. In this state, pins for temporary joint are attached to the transmission case 40 of the automatic transmission 4, and the oil pan 2 is attached to the transmission case 40 of the automatic transmission 4 with the bolt holes 24a of the washer portions 24 of the oil pan 2 being positioned at the pins.

At this time, because of a backlash in the pins for temporary joint, that is, the presence of a clearance between the pins and the transmission case 40 and a clearance between the pins and the bolt holes 24a, as illustrated in FIG. 6, a displacement in a displacement amount d might occur between relative positions of the oil pan 2 and the transmission case 40. However, since the tilt of the gasket 3 is reduced to the angle θ1, the matching portion 42 of the transmission case 40 is in contact with the sealing surface 34 of the gasket 3 in an area greater than or equal to a predetermined amount, irrespective of the displacement amount d, for example, and thus, the gasket 3 does not tilt and, thus, does not protrude, and comes into close contact with the matching portion 42 of the transmission case 40.

Then, the bolts (not shown) are inserted into the bolt holes 24a through the washer portions 24 of the oil pan 2 to be screwed with the transmission case 40, and the oil pan 2 is fastened to the transmission case 40. Then, as illustrated in FIG. 4, the gasket 3 is pressed against a location directly facing the rim portion 23, and thereby, the sealing-equipped oil pan 1 is attached to the automatic transmission 4 without the gasket 3 protruding from the rim portion 23.

As described above, a sealing-equipped oil pan (1) according to the embodiment is a sealing-equipped oil pan (1) comprising: a sealing member (3) that is composed of an elastic member; and an oil pan (2) that has a bottom portion (21), a peripheral wall (22), and a rim portion (23), the bottom portion (21) and the peripheral wall (22) being configured to store oil, the rim portion (23) having a ring shape, located at an end of the peripheral wall (22), and provided with the sealing member (3), the sealing-equipped oil pan (1) being configured to be fastened to a target device (4) with the sealing member (3) being interposed between the rim portion (23) and the target device (4), and is characterized in that the sealing member (3) has a projection (35) projecting from a sealing surface (34) configured to come into contact with the target device (4) for sealing, and the peripheral wall (22) of the oil pan (2) has a base portion (25) projecting from the rim portion (23) and supporting the projection (35) of the sealing member (3).

With this configuration, since the projection 35 of the gasket 3 is supported on the base portion 25 of the oil pan 2, a tilt of the gasket 3 with respect to the rim portion 23 of the oil pan 2 can be prevented, and the gasket 3 does not protrude when the oil pan 2 is attached to a target device such as the automatic transmission 4, thereby securing sealing performance.

The sealing-equipped oil pan (1) is characterized in that the base portion (25) has a flat portion (25a) supporting the projection (35) of the sealing member (3).

With this configuration, the projection 35 can be supported with stability, thereby more reliably preventing the gasket 3 from tilting with respect to the rim portion 23 of the oil pan.

Furthermore, the sealing-equipped oil pan (1) is characterized in that the flat portion (25a) has a trapezoidal shape whose longer bottom side faces the rim portion (23).

With this configuration, as compared to a case where the flat portion 25a is rectangular or triangular, for example, an area for supporting the projection 35 can be secured without an increase in the expansion (volume) of the base portion 25. In addition, the entire base portion 25 can be formed into substantially a trapezoidal shape. Thus, press work can be facilitated so that workability can be enhanced. Since the base portion 25 expands toward the inside of the oil pan 2, the amount of oil stored in the oil pan 2 is reduced. However, since the volume of the base portion 25 can be reduced, the influence of the reduced amount of oil stored can be reduced, and the influence of occurrence of, for example, lubrication shortage in the target device such as the automatic transmission 4 can be also reduced.

The sealing-equipped oil pan (1) is characterized in that the base portion (25) expands from the rim portion (23) toward a region where oil is stored.

With this configuration, when the oil pan 2 is attached to the target device such as the automatic transmission 4, an interference with another part of a vehicle (e.g., a muffler in a case where the target device is an automatic transmission) can be avoided so that the influence on mountability can be prevented.

The sealing-equipped oil pan (1) is characterized in that the projection (35) of the sealing member (3) projects in a direction intersecting a fastening direction of the oil pan (2) in such a manner that a height of the projection (35) of the sealing member (3) inside the rim portion (23) having the ring shape is larger than a height of the projection (35) of the sealing member (3) outside the rim portion (23) having the ring shape.

The sealing-equipped oil pan (1) is characterized in that the sealing member (3) has a return portion (32a) that is located at a distal end of a side wall (32) extending along a shape of the rim portion (23) and that projects toward inside of the rim portion (23).

With this configuration, the return portion 32a of the side wall portion 32 of the gasket 3 is easily engaged with the front end of the rim portion 23 of the oil pan 2, thereby more reliably preventing the gasket 3 from tilting with respect to the rim portion 23 of the oil pan 2.

The sealing-equipped oil pan (1) is characterized in that the oil pan (2) has a plurality of washer portions (24) that projects outward from the rim portion (23) and each of the washer portions (24) has a bolt hole (24a) through which a bolt to be screwed to the target device (4) so as to fasten the oil pan (2) to the target device (4) is inserted, and the base portion (25) is provided on a straight portion of the rim portion located between two of the washer portions (24) and having a predetermined length or more.

With this configuration, the base portion 25 can be efficiently disposed only on a portion where the gasket 3 tends to tilt, that is, the base portion is not disposed on an unnecessary portion. Thus, the influence on, for example, workability of the oil pan 2 (including, for example, the influence of reduction in an oil amount in a case where the base portion 25 expands toward the inside of the oil pan 2) can be minimized.

In the embodiment described above, the base portion 25 expands toward the inside of the oil pan 2. However, as long as vehicle mountability or other properties are not impaired, the base portion 25 may expand toward the outside of the oil pan 2. In this case, the projection 35 of the gasket 3 also projects toward the outside of the oil pan 2 in accordance with the base portion.

In the embodiment described above, the gasket 3 is used as a sealing member, as an example. However, as a matter of course, any member may be used as long as the member is an elastic member having a sealing function.

In the embodiment described above, the base portion 25 and the flat portion 25a are each formed in a trapezoidal shape. However, the shape of each of the base portion 25 and the flat portion 25a is not limited to a trapezoidal shape, and may be any shape as long as the base portion 25 and the flat portion 25a can support especially the projection 35 of the gasket 3 with stability and the volume of the base portion can be reduced.

In the embodiment described above, the base portion 25 is provided only on a straight portion of the rim portion 23 having a predetermined length or more. Alternatively, in consideration of safety for preventing a tilt of the sealing member, a base portion and a projection of the gasket may be provided on each of straight portions. In this case, the portions on which the base portion and the projection of the gasket are provided may be determined in consideration of the amount of oil stored in the oil pan 2, for example.

In the embodiment described above, the sealing-equipped oil pan 1 is attached to the automatic transmission 4. However, the sealing-equipped oil pan 1 may be, as a matter of course, attached to any target device that uses oil, such as a hybrid drive device, an engine, or the like. The shape of the oil pan may, as a matter of course, vary depending on a shape of a target device.

INDUSTRIAL APPLICABILITY

A sealing-equipped oil pan of the present disclosure can be used for a target device such as an automatic transmission, a hybrid driving device, an engine, or the like to be mounted on a vehicle such as an automobile, a truck, or the like and is suitably used especially for a target device that requires prevention of a tilt of a sealing member with respect to a rim portion of an oil pan.

DESCRIPTION OF THE REFERENCE NUMERALS 1 sealing-equipped oil pan
2 oil pan
3 sealing member (gasket)
4 target device (automatic transmission)
21 bottom portion
22 peripheral wall
23 rim portion
24 washer portion
24a bolt hole
25 base portion
25a flat portion
32 side wall (side wall portion)
32a return portion
35 projection

The invention claimed is:

1. A sealing-equipped oil pan comprising:
a sealing member that is composed of an elastic member; and
an oil pan that has a bottom portion, a peripheral wall, and a rim portion, the bottom portion and the peripheral wall being configured to store oil, the rim portion having a ring shape, located at an end of the peripheral wall, and provided with the sealing member, the sealing-equipped oil pan being configured to be fastened to a target device with the sealing member being interposed between the rim portion and the target device, wherein
the sealing member has a projection projecting from a sealing surface configured to come into contact with the target device for sealing, and
the peripheral wall of the oil pan has a base portion projecting from the rim portion and supporting the projection of the sealing member,
wherein the base portion projects in a direction intersecting a fastening direction of the oil pan and expands from the rim portion toward a region where oil is stored with respect to the rim portion having the ring shape,
wherein the base portion has a flat portion supporting the projection of the sealing member, and the flat portion has a trapezoidal shape whose longer bottom side faces the rim portion.

2. The sealing-equipped oil pan according to claim 1, wherein the projection of the sealing member projects in the direction intersecting the fastening direction of the oil pan in such a manner that a height of the projection of the sealing member inside the rim portion having the ring shape is larger than a height of the projection of the sealing member outside the rim portion having the ring shape.

3. The sealing-equipped oil pan according to claim 2, wherein
the sealing member has a return portion located at a distal end of a side wall extending along a shape of the rim portion and projecting toward inside of the rim portion.

4. The sealing-equipped oil pan according to claim 3, wherein
the oil pan has a plurality of washer portions projecting outward from the rim portion and each having a bolt hole through which a bolt to be screwed to the target device so as to fasten the oil pan to the target device is inserted, and
the base portion is provided on a straight portion of the rim portion located between two of the washer portions.

5. The sealing-equipped oil pan according to claim 1, wherein
the sealing member has a return portion located at a distal end of a side wall extending along a shape of the rim portion and projecting toward inside of the rim portion.

6. The sealing-equipped oil pan according to claim 1, wherein
the oil pan has a plurality of washer portions projecting outward from the rim portion and each having a bolt hole through which a bolt to be screwed to the target device so as to fasten the oil pan to the target device is inserted, and
the base portion is provided on a straight portion of the rim portion located between two of the washer portions.

7. A sealing-equipped oil pan comprising:
a sealing member that is composed of an elastic member; and
an oil pan that has a bottom portion, a peripheral wall, and a rim portion, the bottom portion and the peripheral wall being configured to store oil, the rim portion having a ring shape, located at an end of the peripheral wall, and provided with the sealing member, the sealing-equipped oil pan being configured to be fastened to a target device with the sealing member being interposed between the rim portion and the target device, wherein
the sealing member has a projection projecting from a sealing surface configured to come into contact with the target device for sealing, and
the peripheral wall of the oil pan has a base portion projecting from the rim portion and supporting the projection of the sealing member,
wherein the projection of the sealing member projects in a direction intersecting a fastening direction of the oil pan in such a manner that a height of the projection of the sealing member inside the rim portion having the ring shape is larger than a height of the projection of the sealing member outside the rim portion having the ring shape, wherein the base portion has a flat portion supporting the projection of the sealing member, and the flat portion has a trapezoidal shape whose longer bottom side faces the rim portion.

8. The sealing-equipped oil pan according to claim 7, wherein the base portion expands from the rim portion toward a region where oil is stored.

9. The sealing-equipped oil pan according to claim 8, wherein the sealing member has a return portion located at a distal end of a side wall extending along a shape of the rim portion and projecting toward inside of the rim portion.

10. The sealing-equipped oil pan according to claim 9, wherein the oil pan has a plurality of washer portions projecting outward from the rim portion and each having a bolt hole through which a bolt to be screwed to the target device so as to fasten the oil pan to the target device is inserted, and the base portion is provided on a straight portion of the rim portion located between two of the washer portions.

* * * * *